(12) United States Patent
Laue

(10) Patent No.: US 6,464,247 B1
(45) Date of Patent: Oct. 15, 2002

(54) STEERING WHEEL WITH AN AIRBAG MODULE

(75) Inventor: Andreas Laue, Elsenfeld (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/787,235

(22) PCT Filed: Sep. 14, 1999

(86) PCT No.: PCT/DE99/02964

§ 371 (c)(1),
(2), (4) Date: Jul. 17, 2001

(87) PCT Pub. No.: WO00/15469

PCT Pub. Date: Mar. 23, 2000

(30) Foreign Application Priority Data

Sep. 16, 1998 (DE) ...................................... 298 16 925 U

(51) Int. Cl.[7] .............................................. B60R 21/16
(52) U.S. Cl. ..................................... 280/728.2; 280/731
(58) Field of Search .............................. 280/728.2, 731, 280/779; 74/52; 403/13, 25, 227

(56) References Cited

U.S. PATENT DOCUMENTS

| 5,024,464 A | * | 6/1991 | Kawaguchi et al. ......... 280/731 |
| 5,228,362 A | * | 7/1993 | Chen et al. ............... 200/61.55 |
| 5,333,897 A | * | 8/1994 | Landis et al. ............. 200/61.54 |
| 5,410,114 A | | 4/1995 | Furuie et al. ............. 200/61.55 |
| 6,164,689 A | * | 12/2000 | Rivin et al. ................. 280/731 |

FOREIGN PATENT DOCUMENTS

| DE | 37 10173 | 10/1988 |
| DE | 195 81 552 | 9/1995 |
| DE | 44 39 576 | 5/1996 |
| DE | 196 53 684 | 6/1998 |
| EP | 0 788 935 | 8/1997 |
| EP | 0 857 625 | 12/1998 |

* cited by examiner

Primary Examiner—Paul N. Dickson
Assistant Examiner—Faye M. Fleming
(74) Attorney, Agent, or Firm—Foley & Lardner

(57) ABSTRACT

An airbag module is mounted on a steering wheel in such a way that its vibrations are damped. It is connected to the steering wheel by at least one elastic element which has an isolated area for attaching a fixing element of the module.

25 Claims, 3 Drawing Sheets

STEERING WHEEL WITH AN AIRBAG MODULE

BACKGROUND OF THE INVENTION

1. Field of the Invention

The invention relates to a steering wheel with an airbag module.

2. Description of the Related Art

In motor vehicle steering wheels the rigid coupling to the steering column gives rise to the problem of vibrations occurring in the steering wheel, at least in certain speed ranges. These vibrations are caused by the natural frequency of the airbag-steering wheel as a function of a certain engine speed. In addition to shifting the natural frequency of the airbag-steering wheel to a frequency range lying outside the range of the oscillations actually occurring on the steering wheel by fitting an additional mass to the steering wheel, DE 37 10 173 A1, for example, discloses an arrangement wherein, in order to reduce the vibrations, a airbag unit is mounted via a vibration-damping housing to the steering wheel in such a way that it is relatively moveable transversely to the longitudinal axis of the steering column in relation to the steering wheel.

In addition, it is proposed that the housing also be moveable in the direction of the longitudinal axis of the steering column. This mobility is achieved in that retaining clips are arranged at the sides of the housing. These have bearing bushes possessing sound-damping characteristics which are disposed in corresponding holes. The bearing bushes guide lock screws for fixing the retaining clips to the spokes of the steering wheel. There is a clearance between the shank of each lock screw and the respective bush, which permits lateral displacement of the retaining clips in relation to the lock screws.

A floating bearing is therefore obtained. In this case the entire airbag module the cap, which screens it off from the compartment, is mounted on a floating bearing.

The disadvantage of this arrangement is that it is relatively expensive.

SUMMARY OF THE INVENTION

The object of the invention, therefore, is to obtain a vibration-damped mounting of the airbag in the steering wheel at lower cost.

According to the invention, this is achieved by a steering wheel having airbag module which is supported on the steering wheel by a vibration-damped mounting. In this arrangement the airbag module is connected to the steering wheel by at least one elastic element, which has an isolated area for fixing a retaining element of the airbag module. In particular the elastic element has a bush-shaped first section for fixing to the steering wheel and a bush-shaped second section with isolated area for the fixing of the airbag module, the second section surrounding the first section with clearance and being connected to the first section at one side.

Such an elastic element is easy to manufacture, assemble and connect to the airbag module. The elastic element can thus be connected directly to the steering wheel. In a preferred embodiment, however, the first section is fixed on a rigid bush, which can in turn be connected to the steering wheel by a bolt and nut.

It is advisable for the elastic element to be connected to the airbag module at the isolated end of the second section, since in this case maximum damping is achieved. It is furthermore advisable for the elastic element to be composed of an elastomer.

The elastic element is preferably molded on to a carrier plate for a gas generator.

The internal and external contour of the bush-shaped first and second sections preferably have a circular cross section.

In a further development it is proposed that the first section has an irregular wall thickness, its internal and external contours lying eccentrically to one another, for example. In this way a directional oscillation behavior is achieved.

In a further embodiment it is proposed to design the first bush-shaped section with a taper, the cross section diminishing from the point of connection to the second section onwards, for example.

Furthermore, the second bush-shaped section may also taper, the cross section increasing from the point of connection to the first section onwards, for example.

In a preferred embodiment four elastic retaining elements are provided on a carrier plate for the gas generator.

In a further development it is proposed that the airbag module and a cap for covering it be fixed to the steering wheel separately from one another, the cap being firmly connected to the steering wheel.

BRIEF DESCRIPTION OF THE DRAWINGS

The invention will be explained through examples of embodiments, with reference to drawings, in which.

DETAILED DESCRIPTION OF THE PREFERRED EMBODIMENTS

Figure 1:
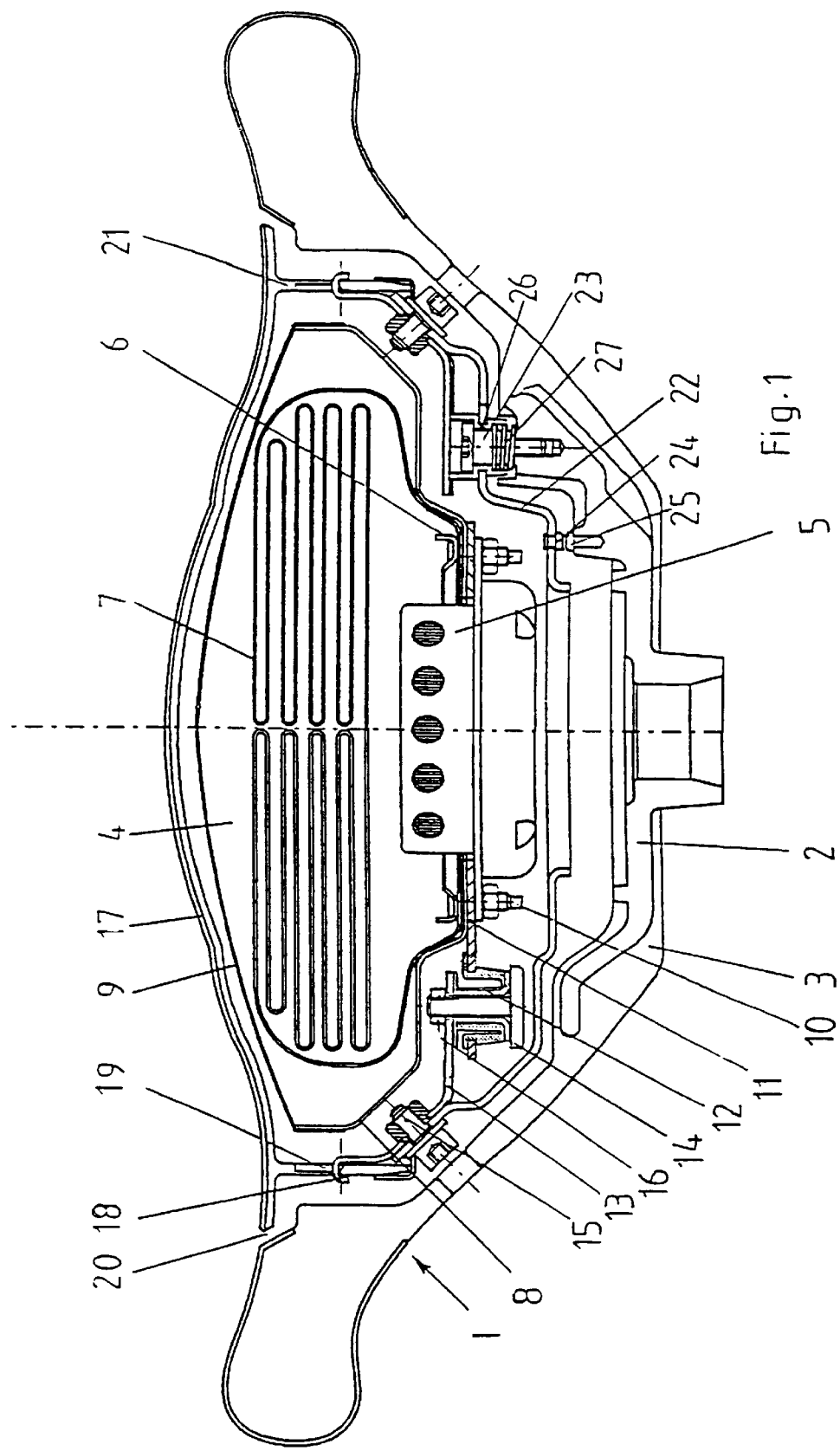
FIG. 1 shows a section through a steering wheel airbag module, which is arranged on an element.

A steering wheel 1 has a steering wheel skeleton 2, which is covered by polyurethane foam 3. An airbag module 4 is arranged inside the steering wheel 1. The module has a gas generator 5, an airbag retaining plate 6, an airbag 7 and a fold space restrictor plate 8 with a cover 9. These components of the airbag module are fixed by means of screws 10 to a carrier plate 11, which is supported In three elastic elements 12, only one of which is visible in FIG. 1 and which act as isolating elements. By way of connecting plates 13, these elements are connected by means of screws 15 to a moving contact 22, which is in turn connected by means of screws 23 to the steering wheel skeleton 2. The elastic elements 12 are fixed to the connecting plates 13 by means of bolts 14 and nuts 16.

Due to the provision of the elastic elements 12, few if any vibrations of the steering wheel are transmitted to the airbag module.

A cap 17, which covers the airbag module 4 off from the passenger compartment, is connected to the steering wheel skeleton 2 by the connecting plates 13. The connection between the cap 17 and the connecting plates 13 is achieved in that the latter are bent over in a hook shape at their upper end 18 and are snapped by the upper end into openings 19 in a side wall 21 of the cap 17. The cap is thus connected to the steering wheel skeleton 2 without any oscillating elements, and when vibrations occur it oscillates in approximately the same way as the steering wheel. This means that there is scarcely any relative movement between the cap 17 and the surface of the steering wheel, so that a slot 20 between the cap 17 and the steering wheel 1 can be small, thereby improving the appearance of the steering wheel.

This mounting according to the invention can be used both for an airbag module that is fixed to the steering wheel and for an airbag module that is displaceable in relation to the steering wheel skeleton for operating the horn (floating horn), as is shown in FIG. 1. In that figure the moving contact 22 with an electrical contact 24 is displaceable in the direction of the steering wheel skeleton 2 having an opposing electrical contact 25. Displacement of the moving contact 22 is possible in that it has bushes 26 in the area of the screws 23, the bushes being displaceable on the screws 23 against the pressure of a spring 27. In response to pressure on the cap 17, the moving contact 22 is therefore displaced together with the airbag module 4, until the contact 24 and the opposing contact 25 touch one another, thereby operating the horn.

Figure 2:
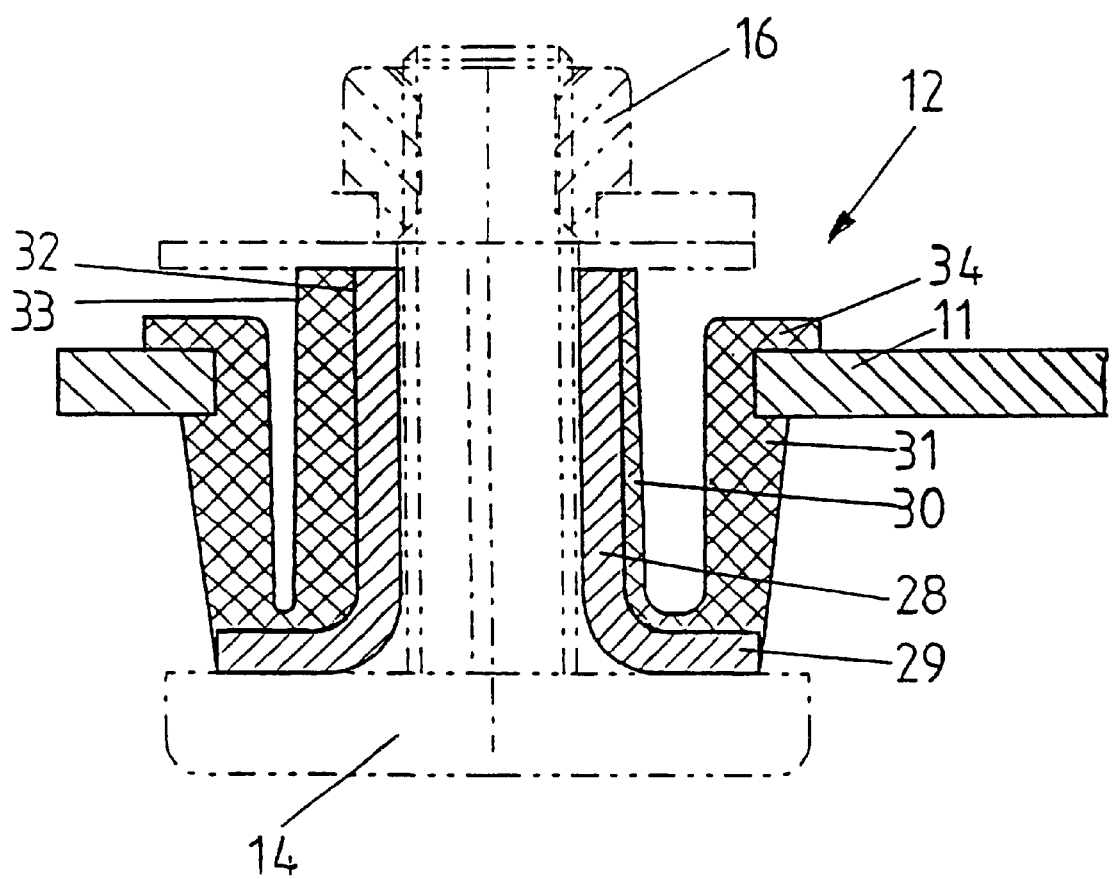
FIG. 2 shows an enlarged representation of the element represented in FIG. 1.

FIG. 2 shows an enlargement of the elastic element 12 used in FIG. 1. This element has a rigid bush 28, which has a flange-like edge 29 at the bottom. Extending around the bush is a first bush-shaped section 30 of elastic material, which is surrounded with clearance by a second bush-shaped section 31 of elastic material. The two sections are connected to one another in the area of the edge 29, thereby constituting a single part in this example of an embodiment. The bush 28 and also the sections 30, 31 have a circular cross section.

The first bush-shaped section 30 tapers from the point of connection to the second section 31 onwards, the cross section diminishing upwards. Furthermore the internal contour 32 and the external contour 33 of the first section 30 lie eccentrically to one another, so that this section has an irregular wall thickness.

The second bush-shaped section 31 also tapers from the point of connection to the first section onwards, the cross section increasing upwards. The upper end 34 of this section is connected as isolated area to the carrier plate 11.

The isolated area is particularly suitable for damping both radial and axial oscillations and thereby also for correspondingly damping the oscillation of the carrier plate 11. Furthermore, this elastic element 12 is easy and inexpensive to manufacture and assemble and takes up little space.

Figure 3:
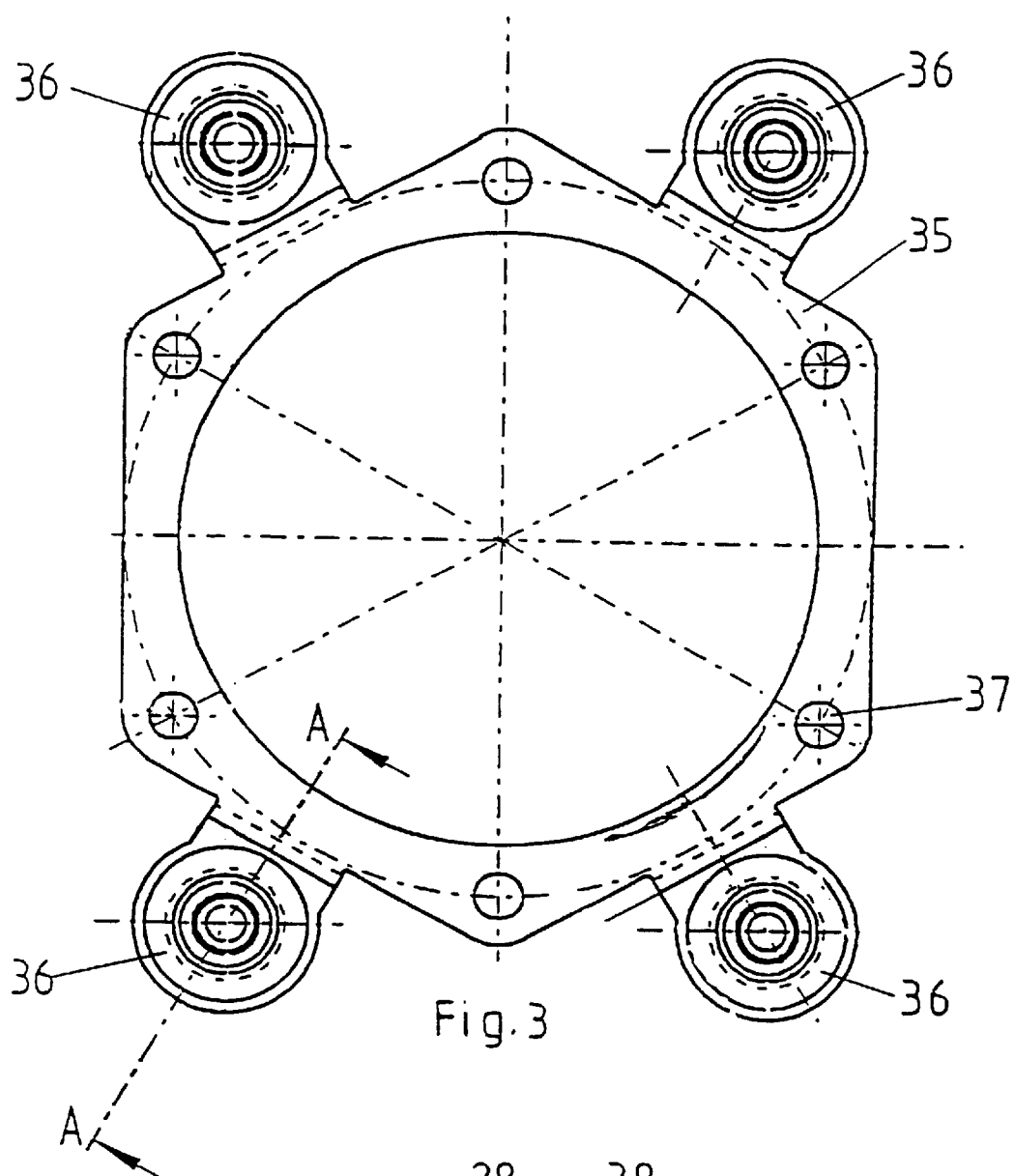
FIG. 3 shows a top view of a carrier plate generator with four elastic elements.
Figure 4:
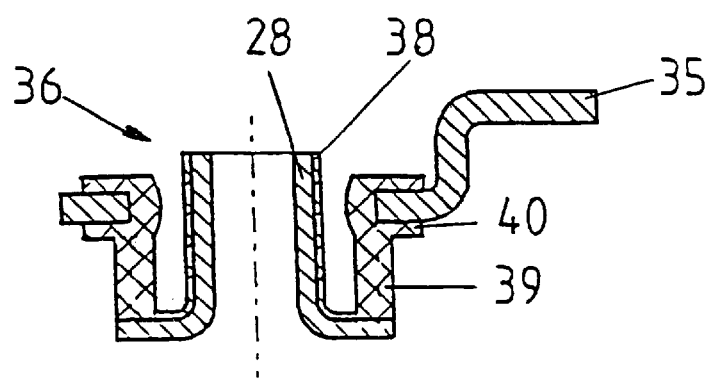
FIG. 4 shows a section through FIG. 3 along

FIG. 3 shows a carrier plate 35, in which four elastic elements 36 are provided. The carrier plate 35 is double-bent in the area of the elastic elements, as can be seen in particular from FIG. 4.

The carrier plate 35 has holes 37 to receive a gas generator (not shown). The elastic elements 36 have a bush-shaped first section 38 and a bush-shaped second section 39, which are cylindrical and coaxial with one another. As in the preceding example of an embodiment, the first section is fixed on a rigid bush 28. The second section is provided with a widened edge 40 at the top to receive the carrier plate 35.

What is claimed is:

1. Steering wheel with an airbag module, which is supported on the steering wheel on a vibration-damped mounting, the airbag module being connected to the steering wheel by at least one elastic element, which has an isolated area for fixing a retaining element of the airbag module, wherein the elastic element has a first section for fixing to the steering wheel and a second section with the isolated area for fixing the airbag module, the second section surrounding the first section with clearance and being connected to the first section at one side.

2. Steering wheel as claimed in claim 1, wherein the first section is fixed on a rigid bush.

3. Steering wheel as claimed in claim 2, wherein the rigid bush has a cylindrical portion and a radially extending flange portion formed at one end, and wherein the first section is disposed on the cylindrical portion of the rigid bush and the second section is seated on and extends up from the radially extending flange.

4. Steering wheel as claimed in claim 1, wherein the elastic element is connected to the airbag module at the isolated end of the second section.

5. Steering wheel as claimed in claim 4, wherein the isolated end of the second section is essentially cylindrical and is formed with an annular recess in which a carrier plate of the airbag module is received.

6. Steering wheel as claimed in claim 1, wherein the elastic element is composed of an elastomer.

7. Steering wheel as claimed in claim 1 wherein the elastic element is molded on to a carrier plate for a gas generator.

8. Steering wheel as claimed in claim 1, wherein the internal contour and external contour of the first section and the second section have a circular cross section.

9. Steering wheel as claimed in claim 8, wherein the internal contour and external contour of the first section lie eccentrically to one another.

10. Steering wheel as claimed in claim 1, wherein the first section has an irregular wall thickness.

11. Steering wheel as claimed in claim 1, wherein the first section tapers.

12. Steering wheel as claimed in claim 11, wherein the cross-section of the first section diminishes from the point of connection to the second section onwards.

13. Steering wheel as in claim 1, wherein the second section tapers.

14. Steering wheel as claimed in claim 13, wherein the cross section increases from the point of connection to the first section onwards.

15. Steering wheel as claimed in claim 1, wherein four elastic retaining elements are provided on a carrier plate for the gas generator.

16. Steering wheel as claimed in claim 1, wherein the airbag module and a cap for covering it are fixed to the steering wheel separately from one another, the cap being firmly connected to the steering wheel.

17. Steering wheel as claimed in claim 1, wherein the first section is essentially cylindrical and the second section is essentially cylindrical.

18. Steering wheel as claimed in claim 17, wherein the first section is eccentric with respect to the second section.

19. Steering wheel as claimed in claim 17, wherein the first section is concentric with respect to the second section.

20. Steering wheel as claimed in claim 1, wherein the first section is unitary with the second section.

21. A steering wheel with an airbag module, comprising an elastic element having:

a first central cylindrical section having a bore adapted to receive a shaft forming part of the steering wheel, and a unitary second cylindrical section adapted for connection to the airbag module, the second cylindrical section surrounding an outer periphery of the first section so as to defined a clearance between the outer periphery of the first central section and an inner surface of the second cylindrical section.

22. A steering wheel as claimed in claim 21, further comprising:

a radially extending portion which interconnects one end of the first central section with the second cylindrical section, and an annular groove which is formed in a second free end of the second cylindrical section remote from the first end and which is adapted to receive a plate member associated with the airbag module.

23. A steering wheel as claimed in claim 22, further comprising a rigid bush disposed snugly in the bore of the first central cylindrical section, the rigid bush having a radially extending flange which engages the radially extending portion of the elastic element.

24. A steering wheel as claimed in claim 21, wherein the first central section is concentric with respect to the second cylindrical section.

25. A steering wheel as claimed in claim 21, wherein the first central section is eccentric with respect to the second cylindrical section.

* * * * *